United States Patent
Wright et al.

(10) Patent No.: US 7,444,450 B2
(45) Date of Patent: *Oct. 28, 2008

(54) METHOD AND SYSTEM FOR DETECTING EXCESSIVE INTERRUPT PROCESSING FOR A PROCESSOR

(75) Inventors: Randall F. Wright, Fort Collins, CO (US); Jerry A. Hoemann, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 11/117,962

(22) Filed: Apr. 28, 2005

(65) Prior Publication Data

US 2005/0246466 A1 Nov. 3, 2005

Related U.S. Application Data

(60) Provisional application No. 60/566,281, filed on Apr. 28, 2004.

(51) Int. Cl.
*G06F 13/26* (2006.01)
*G06F 9/46* (2006.01)

(52) U.S. Cl. .................. 710/264; 718/102; 710/260

(58) Field of Classification Search ................ 710/260, 710/267, 263–266; 718/102–105, 107, 108; 702/86–89, 79, 188, 189
See application file for complete search history.

(56) References Cited

U.S. PATENT DOCUMENTS

| 3,719,942 A | * | 3/1973 | Herman et al. | 342/92 |
| 4,849,879 A | * | 7/1989 | Chinnaswamy et al. | 706/45 |
| 6,061,305 A | * | 5/2000 | Williams | 368/113 |
| 6,633,942 B1 | * | 10/2003 | Balasubramanian | 710/264 |
| 6,697,870 B1 | * | 2/2004 | Cafarelli et al. | 709/233 |

OTHER PUBLICATIONS

Van Jacobson, et al., Congestion Avoidance and Control, Nov. 1988, pp. 1-25.

* cited by examiner

*Primary Examiner*—Glenn A. Auve
*Assistant Examiner*—Trisha Vu

(57) ABSTRACT

A method and system is provided for detecting excessive interrupt processing for a processor. The method includes the operation of defining an interrupt processing period during which measuring of interrupts for a processor takes place. The amounts of time being spent by the processor in an interrupt context can then be measured during the interrupt processing period. A further operation is detecting an interrupt storm occurring for the processor based on the amounts of time spent by the processor in interrupt context during the interrupt processing period.

26 Claims, 3 Drawing Sheets

METHOD AND SYSTEM FOR DETECTING EXCESSIVE INTERRUPT PROCESSING FOR A PROCESSOR

CROSS-REFERENCE TO RELATED APPLICATIONS AND CLAIM OF PRIORITY

Priority of U.S. (Provisional) patent application Ser. No. 60/566,281 filed on Apr. 28, 2004 (is claimed).

FIELD OF THE INVENTION

The present invention relates generally to detecting excessive interrupt processing for a processor.

BACKGROUND

A multiprocessor system may face a critical situation when one or more of its processors spends an inordinate amount of time handling external interrupts. An interrupt storm on a processor or in an operating system kernel is generally defined as the condition where the processor spends such a large amount of its processing time in an interrupt context that processes or lower priority interrupts are blocked from normal execution. Two other indicators of this situation are when the processor receives multiple contiguous interrupts or a few interrupts each of which spends an extended amount of time being processed.

In the past the mindset has been that when a processor was spending an inordinate amount of its processing power on servicing interrupts, then a good design choice would be to substitute a more powerful processor for the slower processor. Because processors have been steadily increasing in processing power and relatively decreasing in cost, this problem of excessive interrupts has been solved by applying more computing power. Unfortunately, increasing the processing power often increases the cost of a system by adding another processor to the system or including a more powerful and costly processor. Another option has been to prioritize incoming interrupts so that the most important interrupts are processed first. Regardless of the amount of increased processing power available, there may be situations where the number of interrupts can overwhelm even the fastest processor.

An interrupt storm may happen due to an excessive amount of device interrupts from one or more devices or due to an error condition in a device. I/O (Input/Output) interrupts can present a particular problem to an operating system kernel because of the longer time period required to service such interrupts. Even with interrupts that take a shorter time to process, a large number of interrupts can block out processes that would otherwise be executed by the kernel.

An example of a situation that can cause an interrupt storm is a network router that is configured incorrectly or may be having a hardware failure. If the network router is receiving packets from one or more networks and then incorrectly sending all or a large part of the packets back to a single network, then the receiving network server will be overwhelmed by interrupts for the network packets. Particularly, a network card for the network server will generate an overwhelming amount of I/O interrupts to the server processor and its operating system kernel.

In a similar situation, a network router may be misconfigured in a loop back situation where the network packets sent to the router by a server are bounced directly back to the network or server that sent the packets. This can also cause an interrupt storm. Further, a denial of service attack or flood of communication packets illustrates other situations where an interrupt storm may take place. Of course, there may simply be peripheral devices or network components that require a significant amount of interrupt attention or I/O.

Whatever the reason, such a situation can result in other important processes being blocked from executing on the processor. If the blocked process in question is a heartbeat timer or any time sensitive process, the operating system or diagnostic software may be misled into flagging an error condition on the system, which in turn may activate unnecessary correction triggers. For example, specialized diagnostic software may be executing on the computer and when the diagnostic software does not receive the appropriate heartbeat or other processing signals, then the diagnostic software may reboot the server because the server appears to the diagnostic software to have crashed. In a severe case, an interrupt storm may result in the constant rebooting of the server if the interrupt storm cannot be accurately detected.

SUMMARY OF THE INVENTION

The invention provides a method and system for detecting excessive interrupt processing for a processor. The method includes the operation of defining an interrupt processing period during which measuring of interrupts for a processor takes place. The amounts of time being spent by the processor in an interrupt context can then be measured during the interrupt processing period. A further operation is detecting an interrupt storm occurring for the processor based on the amounts of time spent by the processor in interrupt context during the interrupt processing period.

Additional features and advantages of the invention will be apparent from the detailed description which follows, taken in conjunction with the accompanying drawings, which together illustrate, by way of example, features of the invention.

DETAILED DESCRIPTION

Figure 1:
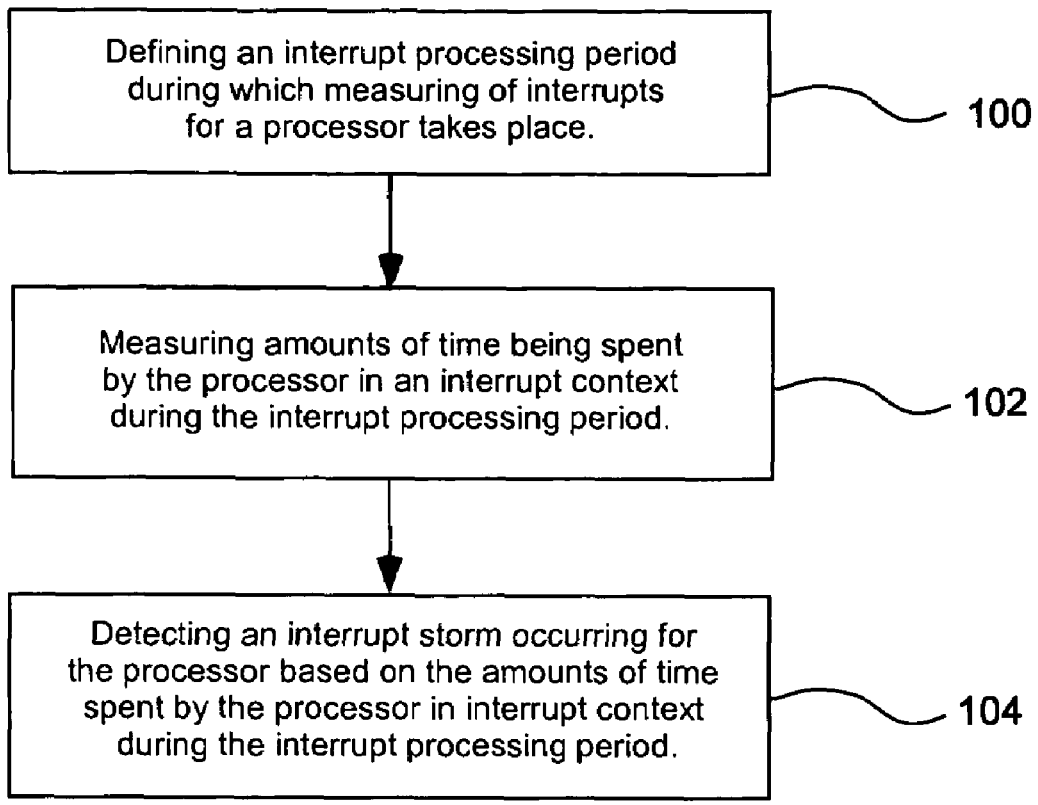
FIG. 1 is a flow chart illustrating a method for detecting excessive interrupt processing for a processor in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention provides a method and system for detecting excessive interrupt processing for a processor. Particularly, the present invention helps overcome the problem where a processor is inundated because processes are trapped behind a continuous flood of interrupts and/or lengthy interrupts. A processor that is overwhelmed with interrupts can allow the interrupts to consume processing cycles to the point that the system's processes or applications appear to have crashed or hung up. As mentioned previously, this situation can invoke undesirable failovers in hardware and software diagnostic tools. An overloaded processor can also result in other symptomatic problems, such as a slowly executing operating system or applications.

It is valuable to be able to detect interrupt storms because then notification can be provided or corrective action can be taken. For example, the system can notify a system administrator that corrective action needs to be taken or problems associated with interrupt storms need to be corrected. Accordingly, the processor or operating system kernel of the present invention is enabled to predictably detect an interrupt storm for a processor.

An interrupt storm on a processor or for an operating system kernel is generally defined in this invention as the condition where the processor spends more than a specified percentage of its processing time in interrupt context. In the past, the detection of interrupt storms has not been done because if a processor appeared to be to slow for unknown reasons (i.e., undetected interrupt problems), then a more powerful processor was purchased or the next generation of processors quickly replaced the slower processors. However, processors in the past did not generally have the advanced self-diagnostic capabilities that are now available. These self-diagnostic capabilities are desirable because they provide a high degree of reliability for mission critical systems. Accordingly, current processors have self-correcting software that endeavors to reboot the processor if it appears as though the processor has crashed when the processor is inundated by interrupts.

FIG. 1 illustrates that the method of the present invention includes the operation of defining an interrupt processing period during which the measuring of interrupts for a processor can take place, as in block 100. In one embodiment, the present invention can monitor the time periods a processor spends in interrupt context handling interrupts by establishing a constantly moving window of processor activity. For example, the window of activity may be 10 milliseconds.

The amounts of time being spent by the processor in an interrupt context during the interrupt processing period can then be measured, as in block 102. A further operation in the method is to detect an interrupt storm occurring for a processor. The detection can be based on the amounts of time spent by the processor in the interrupt context during the interrupt processing period, as in block 104. An interrupt storm condition may be determined by a periodic calculation of average time spent in interrupt context and then comparing the calculated value with a user tunable threshold. In further embodiments of the invention, a weighted average or a decaying average can be used for the average calculation. Alternatively, the detection can be based on a high level of processing within a given window, detecting "long interrupt contexts" without averaging, or by using an external network device that monitors incoming interrupts from certain classes of devices.

Once the interrupt storm has been detected, then a system administrator or user can be notified through a console, system log messages, email messages or instant messaging that the interrupt storm condition has been detected. Other corrective action can take place as defined by a system administrator or within corrective software on the processing system. For example, the blocked processes may be moved to another processor or filtering of specific types of network packets may occur.

Figure 2:
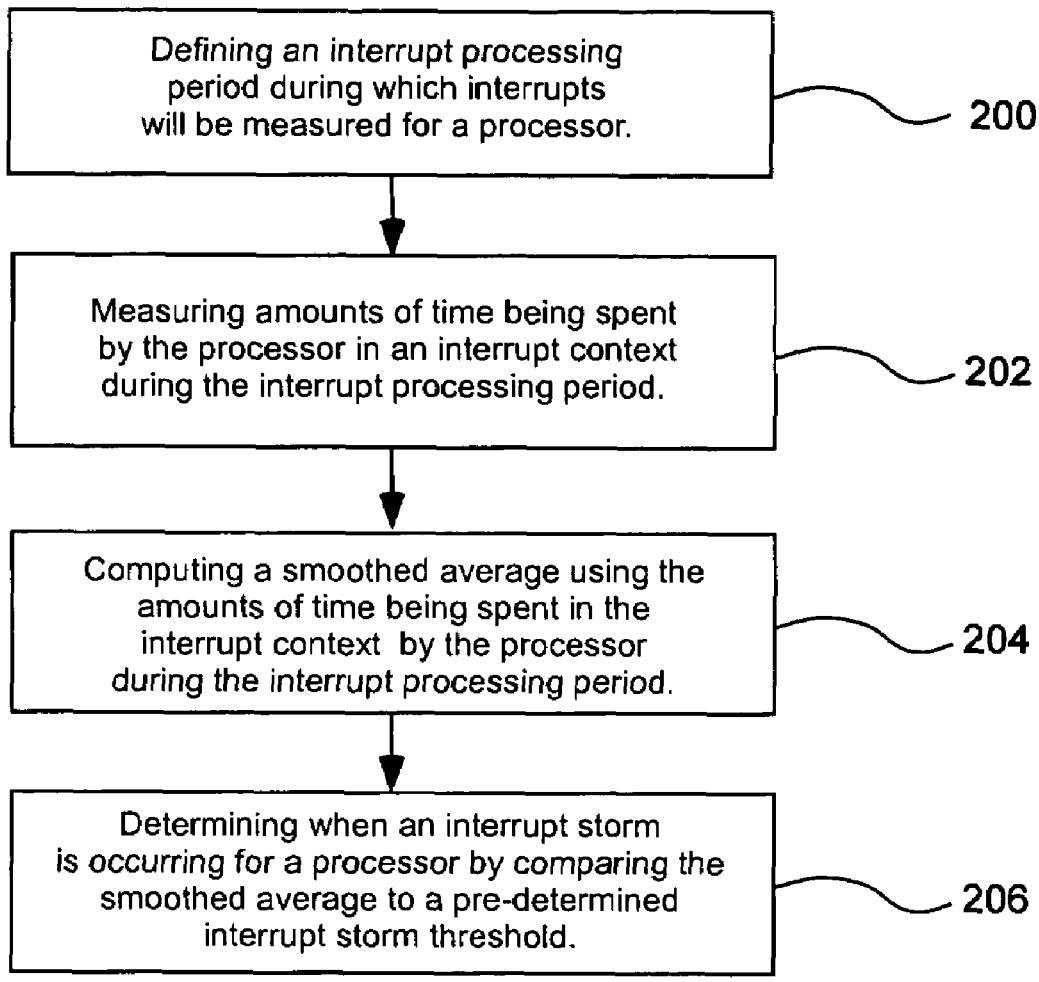
FIG. 2 is a flow chart depicting an embodiment of a method for detecting excessive interrupt processing for a processor using a smoothed average.

Now that a more generic embodiment of the detection method has been described, a more detailed embodiment of the invention will be set forth. A method is provided for detecting excessive interrupt processing for a processor using smooth averaging as in FIG. 2. The first operation includes defining an interrupt processing period during which interrupts will be measured for a processor as in block 200. This interrupt processing period will generally be a window of a pre-defined number of milliseconds as described before.

A further operation is measuring amounts of time being spent by the processor in an interrupt context during the interrupt processing period as in block 202. In order for the detection to take place more accurately, it is beneficial for interrupt priorities to be taken into account. The reason for this is when the time spent by the processor in interrupt context is measured using interrupt routines with the same priority as device interrupts, this can cause the time spent in the interrupt context to be measured incorrectly. In other words, an interrupt routine for measuring time in interrupt context that has the same priority as device level interrupts may not even get called until an interrupt storm has entirely passed. For example, measuring the time spent in an Interrupt Service Routine (ISR) may not be enough if the ISR takes several milliseconds and/or two or three extended periods are placed back to back.

The present invention can measure the amounts of time being spent by the processor in an interrupt context by applying interrupt priorities in a manner such that comparatively accurate detection takes place. In order to overcome the obstacle described, a higher priority clock level interrupt can be used to measure the time spent in interrupt context for the device level drivers. This "nested" interrupt configuration allows the time spent in interrupt context to be more accurately measured because the clock interrupt has a higher priority and can briefly preempt the device level interrupt when needed. In other words, the measuring metric for the interrupt storm is measured from within a base level interrupt that can be activated and nested by context switching within the device level interrupts. This method avoids the problems that would otherwise be present if the time spent in interrupt context were measured from the kernel code.

The amounts of time detected spent by the processor in the interrupt context during the interrupt processing period can then be used to compute a smoothed average, as in block 204. In one embodiment, the smoothed average can be calculated using just addition, subtraction and bit shifting. In addition, the average may also be scaled. These operations are comparatively efficient and do not affect the overall operating system kernel load significantly. A scaled value in the interrupt critical section (ICS) can be obtained every clock tick as:

current_value=previous_value−
(previous_value>>gain_factor)+current ICS time.

And a smooth average can be obtained from scaled value in ICS time as:

smooth_average=current_value>>gain_factor

The scaled value goes up when the processor spends more than the threshold time in interrupt context for several clock cycles. Under normal conditions, the scaled value remains steady with some variance and goes up under an interrupt storm condition. The value increases as the time spent in interrupt context increases. A first time detection of storm may take several clock ticks. The subsequent immediately following storm can be detected very fast as the scaled value and scaled average are already high.

A gain of 4 (i.e., value of gain_factor 2 amounts to gain of 4) has been recommended as a beneficial implementation of the present invention. Of course, any other desired gain factor can be used.

The system can determine when an interrupt storm is occurring for a processor by comparing the smoothed average to a pre-determined interrupt storm threshold, as in block 206. This comparison can take place at predetermined intervals during the interrupt processing period or window. Alternatively, the comparison can take place at a time interval that is equal to the window time and then the window can be reset.A There are generally three known typical interrupt storm conditions. One is where a large number of interrupts are coming to the same processor. In this condition, an incoming interrupt bit is asserted before the processor comes out of the Interrupt Critical Section (ICS) or interrupt context. The time spent in ICS may be 100% of the processor time for several clock ticks or even a few seconds. The condition is detected as the storm contributes 100% of the processor time to the scaled value and smoothed average. Using the scaled smooth averaging, several interrupts are processed before another interrupt storm is declared.

A second storm condition is where there are a few interrupts but each Interrupt Service Routine (ISR) takes an extended period of time. In this condition, the ISR time is so large that interrupt bits are asserted before it finishes. While this is not technically a storm condition, the result is the same because the interrupts keep the processor busy in interrupt context for a long time. In this situation, just a few interrupts (in some cases only one) are processed before a storm is declared.

A third storm situation is a mix of case one and case two. The third storm condition will also spend a significant amount of time in the ICS due to a mixture of long interrupts and/or a large number of interrupts. Thus, the smooth averaging will also be able identify this condition as well.

The time spent by the processor in interrupt context may be stored in a per processor data structure from which the scaled smooth average is calculated. When the smoothed average is more than the given threshold stored in the data structure, a storm condition can be declared. The threshold can be loaded or calculated from a tunable variable for the interrupt percentage, which is a measure of the maximum percent of system time a processor can be in interrupt context. For example, a user can set the interrupt percentage to any desired percentage (e.g., 0% to 100%).

Brief peaks of processor time exceeding the configured value will not generally be considered to be an interrupt storm condition because they do not increase the average interrupt processing time significantly. One automated method for coping with the interrupt storm is to switch off any new incoming I/O interrupts for a preset length of time. These interrupts can be switched back on again after a delay time or if the processor does not have any more processes to schedule. Of course, there are many other automated methods for coping with the detected interrupt storm.

Figure 3:
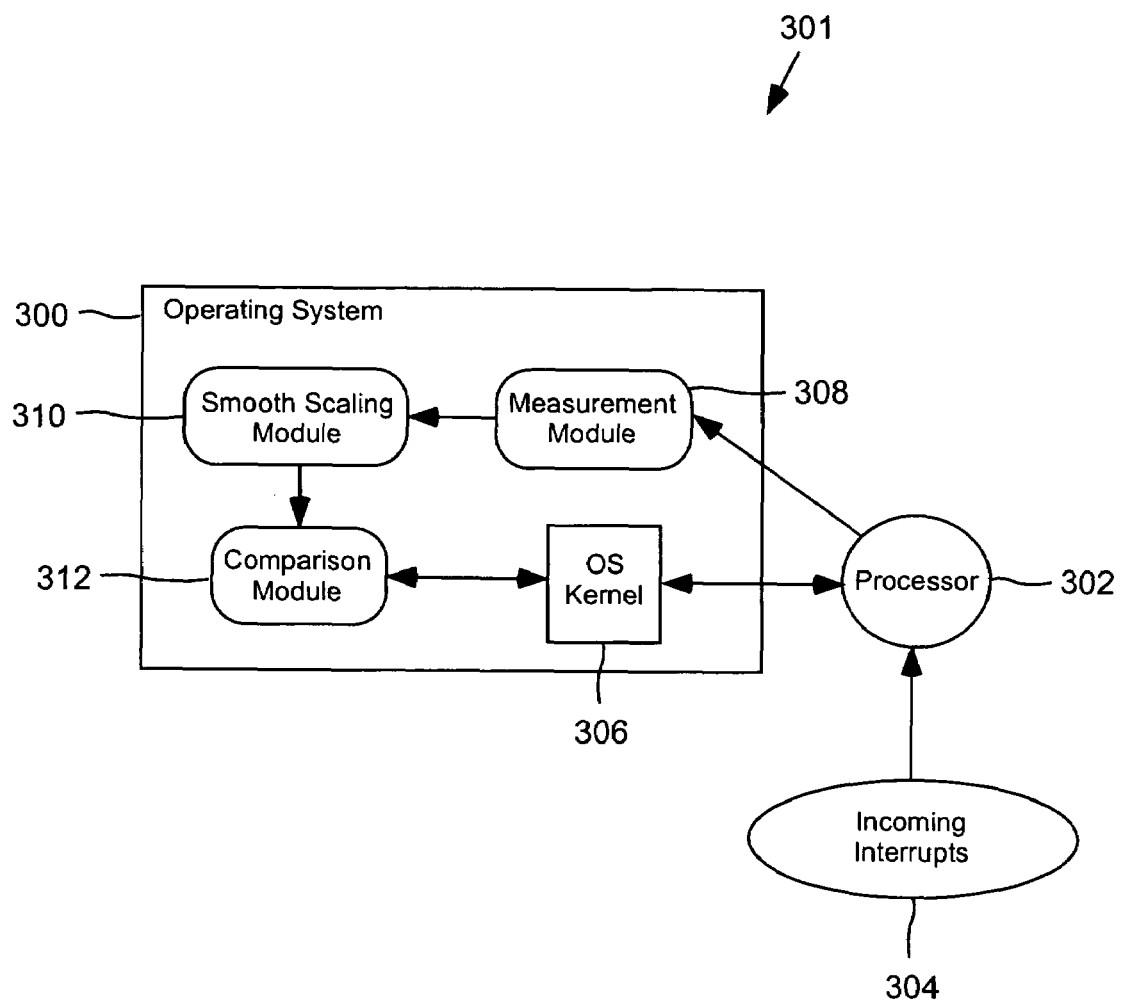
FIG. 3 is a block diagram illustrating an embodiment of a system for detecting excessive interrupt processing overhead for a processor.

FIG. 3. illustrates a block diagram of a system 301 for detecting excessive interrupt processing overhead for a processor 302. An operating system kernel 306 can be configured for scheduling of processes that will execute within the operating system 300. The processor can receive executing processes from the operating system kernel and hardware interrupts. In addition, the processor can switch to interrupt context when in an incoming interrupt 304 is received.

A measurement module 308 is provided to measure amounts of time being spent by the processor 302 in the interrupt context over a defined interrupt processing period. A smooth scaling module 310 can compute a smoothed average of detected amounts of time being spent in interrupt context by the processor. A comparison module 312 is provided for comparing the smoothed average received from the smoothing scaling module with a pre-determined interrupt storm threshold. This comparison can then identify when an interrupt storm is taking place because the smooth scaled value will exceed the interrupt storm threshold. The pre-determined interrupt storm threshold is dynamically definable by a system administrator. As mentioned before, one beneficial value for the pre-determined interrupt storm threshold is at least 80% of the processor's total processing capability. This setting helps avoid identifying an interrupt storm too early or too late.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for detecting excessive interrupt processing for a processor, comprising:
    defining an interrupt processing period during which measuring of interrupts for a processor takes place;
    measuring amounts of time being spent by the processor in an interrupt context during the interrupt processing period by assigning different interrupt priorities to device level interrupts and to interrupt routines for measuring time in the interrupt context; and
    detecting when an interrupt storm occurs for the processor based on the amounts of time spent by the processor in interrupt context during the interrupt processing period, wherein the interrupt storm occurs when the processor spends more than a specified percentage of processing time in the interrupt context.

2. A method as in claim 1, wherein a higher priority clock level interrupt measures the amounts of time in the interrupt context for device level drivers.

3. A method as in claim 1, wherein the different interrupt priorities include a clock interrupt that preempts the device level interrupts.

4. A method as in claim 1, wherein a measuring metric for the interrupt storm is measured from within a base level interrupt that is activated and nested by context switching within the device level interrupts.

5. A method as in claim 1 further comprising, establishing a constantly moving window of processor activity for measuring the amounts of time being spent by the processor in the interrupt context.

6. A method as in claim 1, wherein the step of detecting an interrupt storm further comprises the step of detecting a plurality of contiguous interrupt contexts that are interpreted as an interrupt storm.

7. A method as in claim 1, wherein the step of measuring amounts of time being spent by the processor in an interrupt context further comprises the step of computing a smoothed average of amounts of time being spent in interrupt context by the processor.

8. A method as in claim 7, wherein the step of detecting an interrupt storm further comprises the step of determining when an interrupt storm is occurring for a processor by comparing the smoothed average to a pre-determined interrupt storm threshold.

9. A method for detecting excessive interrupt processing for a processor, comprising the steps of:
    defining an interrupt processing period during within which interrupts are measured for a processor;
    assigning interrupt routines a different priority than device interrupts to correctly measure amounts of time being spent by the processor in an interrupt context during the interrupt processing period;
    computing a smoothed average using the amounts of time spent in the interrupt context by the processor during the interrupt processing period;
    determining when an interrupt storm is occurring for the processor by comparing the smoothed average to a pre-determined interrupt storm threshold.

10. A method as in claim 9, wherein the step of determining when an interrupt storm is occurring further comprises the step of comparing the smoothed average to a user definable threshold of a processor's maximum processing capability.

11. A method as in claim 9, wherein the step of determining when an interrupt storm is occurring further comprises the step of comparing the smoothed average to at least an 80% threshold of a processor's maximum processing capability.

12. A method as in claim 9, wherein the step of computing a smoothed average further comprises the step of computing a scaled smoothed average of the time spent in an interrupt context.

13. A method as in claim 9, wherein the step of computing a smoothed average further comprises the step of computing a scaled smoothed average of the time spent in an interrupt context using a gain factor.

14. A method as in claim 9, wherein the step of computing a smoothed average further comprises the step of computing a smoothed average by computing a time based weighted average of the time spent in the interrupt context.

15. A method as in claim 9, wherein the step of computing a smoothed average further comprises the step of computing a smoothed average by computing a time based decaying average of the time spent in interrupt context.

16. A method as in claim 9, wherein the step of defining an interrupt processing Period further comprises the step of defining a measurement window that is a time period During which interrupts in the interrupt context are measured.

17. A method as in claim 9, wherein the step of computing a smoothed average further comprises the step of resetting the interrupt processing period each time an interrupt storm is detected.

18. A method as in claim 9, wherein a higher priority clock level interrupt measures the amounts of time in the interrupt context for device level drivers.

19. A system for detecting excessive interrupt processing overhead for a processing system, comprising:
    an operating system kernel configured to schedule processes;
    a processor configured to execute processes received from the operating system kernel and receiving interrupts, wherein the processor switches to interrupt context when in an interrupt is received;
    a measurement module configured to measure amounts of time spent by the processor in interrupt context over an interrupt processing period by assigning different interrupt priorities to device level interrupts and to interrupt routines for measuring time in the interrupt context;
    a smooth scaling module configured to compute a smoothed average of measured amounts of time spent in interrupt context by the processor; and
    a comparison module for comparing the smoothed average received from the smoothing scaling module with a pre-determined interrupt storm threshold to identify an interrupt storm.

20. A system as in claim 19, wherein the pre-determined interrupt storm threshold is dynamically definable by a user.

21. A system as in claim 19, wherein the pre-determined interrupt storm threshold is at least 80% of the processor's total processing capability.

22. A system as in claim 19, wherein the smooth scaling module calculates a smoothed average by computing a time based weighted average of the amounts of time spent in interrupt context.

23. system as in claim 19, wherein the smooth scaling module calculates a smoothed average by computing a time based decaying average of the amounts of time spent in interrupt context.

24. A method for detecting excessive interrupt processing overhead for an operating system kernel, comprising the steps of:
    defining a processing period over which interrupts will be measured for an operating system kernel;
    measuring amounts of time being spent by the operating system kernel in an interrupt context by assigning different interrupt priorities to device level interrupts and to interrupt routines for measuring time in the interrupt context;
    computing a smoothed average of amounts of time being spent in interrupt context by the operating system kernel;
    determining when an interrupt storm is occurring for a operating system kernel by comparing the smoothed average to a pre-determined interrupt storm threshold.

25. A system for detecting excessive interrupt processing overhead for a processing system, comprising:
    an operating system kernel means configured to schedule processes;
    a processor means for executing processes received from the operating system kernel means and receiving interrupts, wherein the processor means switches to interrupt context when in an interrupt is received;
    a measurement means that assigns different interrupt priorities to device level interrupts than to interrupt routines for measuring amounts of time spent by the processor means in interrupt context over an interrupt processing period;
    a smooth scaling means for computing a smoothed average of measured amounts of time spent in interrupt context by the processor means; and
    a comparison means for comparing the smoothed average received from the smooth scaling means with a pre-determined interrupt storm threshold to identify an interrupt storm.

26. An article of manufacture, comprising:
    a computer usable medium having computer readable program code embodied therein for detecting excessive interrupt processing for a processor, the computer readable program code means in the article of manufacture comprising:
    computer readable program code configured for defining an interrupt processing period during which measuring of interrupts for a processor takes place;
    computer readable program code configured for measuring amounts of time being spent by the processor in an interrupt context during the interrupt processing period by assigning different interrupt priorities to device level interrupts and to interrupt routines for measuring time in the interrupt context; and
    computer readable program code configured for detecting when an interrupt storm occurs for the processor based on the amounts of time spent by the processor in interrupt context during the interrupt processing period, wherein the interrupt storm occurs when the processor spends more than a specified percentage of processing time in the interrupt context.

* * * * *

UNITED STATES PATENT AND TRADEMARK OFFICE
CERTIFICATE OF CORRECTION

PATENT NO.        : 7,444,450 B2
APPLICATION NO.   : 11/117962
DATED             : October 28, 2008
INVENTOR(S)       : Randall F. Wright et al.

It is certified that error appears in the above-identified patent and that said Letters Patent is hereby corrected as shown below:

In column 4, line 61, after "reset." delete "A".

In column 7, line 18, in Claim 16, delete "Period" and insert -- period --, therefor.

In column 7, line 19, in Claim 16, delete "During" and insert -- during --, therefor.

In column 7, line 57, in Claim 23, insert -- A -- before "system".

Signed and Sealed this

Fourth Day of August, 2009

JOHN DOLL
*Acting Director of the United States Patent and Trademark Office*